Oct. 6, 1942.   H. V. PUTMAN ET AL   2,298,229
TRANSFORMER SIGNALING AND TRIPPING
Filed March 8, 1940
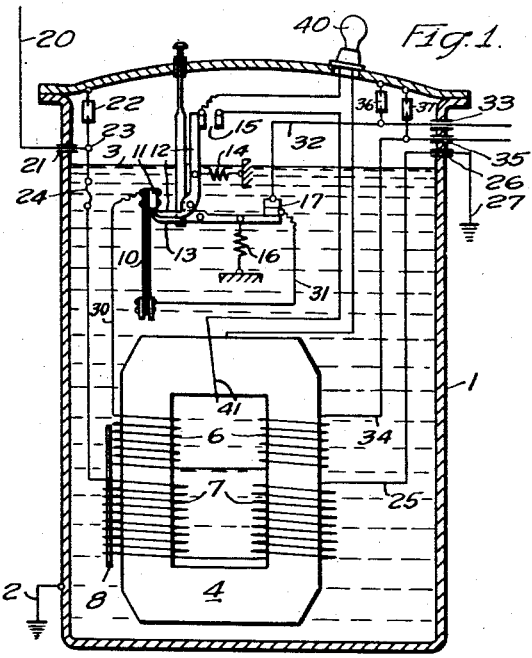
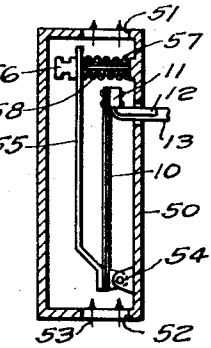
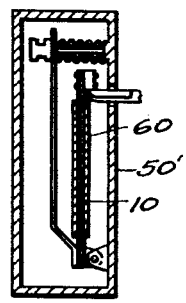
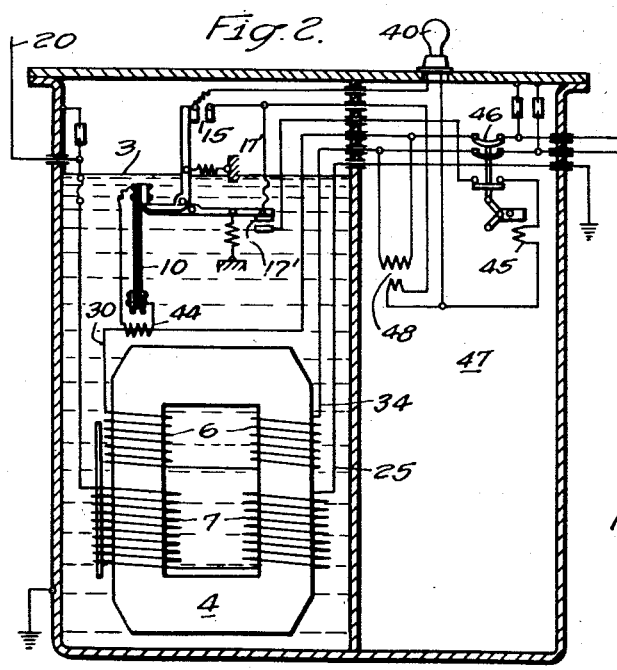
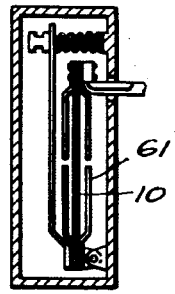
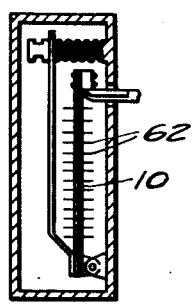
INVENTORS
Henry V. Putman, Arthur M. Lockie,
John K. Hodnette & Merrill G. Leonard.

Patented Oct. 6, 1942

2,298,229

UNITED STATES PATENT OFFICE 2,298,229

TRANSFORMER SIGNALING AND TRIPPING

Henry V. Putman, Arthur M. Lockie, John K. Hodnette, and Merrill G. Leonard, Sharon, Pa., assignors to Westinghouse Electric & Manufacturing Company, East Pittsburgh, Pa., a corporation of Pennsylvania Application March 8, 1940, Serial No. 322,940

16 Claims. (Cl. 175—294)

Our invention relates to means and methods for operating electrical transformers in response to their so-called copper-temperature, or the temperature attained by the copper or other electrical conductor of the coils, which is to say, the temperature of the insulation which is in contact with the copper.

Our invention is an improvement over the completely self-protected transformer which is described and claimed in a Patent No. 2,066,935, issued on January 5, 1937, to John K. Hodnette, and assigned to the Westinghouse Electric & Manufacturing Company. Our present invention is also an improvement over the signal-controlled transformer which is described and claimed in the copending application of Henry V. Putman, Serial No. 91,654, filed July 21, 1936, Patent No. 2,223,530, granted December 3, 1940, and assigned to the Westinghouse Electric & Manufacturing Company. The aforesaid patents describe an important transformer-development whereby the three insulations of the transformer (that is, the insulation between the high-voltage winding and the low-voltage winding, and the insulations between each winding and the metal tank or casing) are adequately protected against failure as a result of any possible excess-voltage surge to which the transformer might possibly be subjected; the insulations are also protected against failure as a result of overheating due either to a heavy short-circuit on the secondary windings of the transformer or to a long-continued excessive overload; and the troublesome primary fuses, which previously caused unnecessary outages, have been either dispensed with entirely or relegated to a relatively inaccessible location inside of the connections to the primary lightning-arresters or excess-voltage protectors, the primary fuse being, at the same time, made large enough to blow only in the event of the well-nigh impossible occurrence of a short-circuit in the primary winding of the transformer. In some instances, also, a new signaling means was introduced, in the form of a self-locking control-circuit which would turn on an externally visible light which would stay on, and give warning, whenever the transformer approached within 30° C. (or other margin) of the maximum permissible temperature-conditions, so that it was no longer necessary to make costly load-studies, or to initially install a larger size of transformer than was really thought to be necessary, in order to play safe against service-interruptions, because the warning-light would now give timely warning of the necessity for replacing any particular transformer with one of a larger size or rating due to load-growth.

Our present invention relates to various improvements in the joint response to oil-temperature and current, for securing an improved operation of the thermally responsive element which controls the signaling and/or the ultimate tripping-out of either a distribution-transformer or a power-transformer which is protected in accordance with its copper-temperature.

One of the objects of our invention is to provide means for obtaining an increased current-carrying capacity of the transformer, when operating on momentary heavy overloads for a short time of the order of a minute or less, as during the starting of a large motor on a small distribution-transformer, or when burning out a short-circuit on the secondary network to which a network-transformer is connected. This object of our invention is accomplished by increasing and lengthening the bimetal temperature-transient, during which time the electrical energy-input into the bimetal member (or other thermally responsive device) is being expended in heating the mass of the bimetal member.

Another object of our invention is to provide a method and means whereby the bimetal-response may be adjusted so as to give a delayed tripping, or a delayed signaling-indication, that is, a transformer-control operation which depends upon an increase in the oil-temperature of the transformer, in a certain definite useful-overload range extending approximately up to N times the normal, full-load current $I_n$, the overload $NI_n$ marking approximately the border-line between delayed operation for useful overloads and immediate operation for what may be termed short-circuit conditions. We obtain this object of our invention by adjusting the bimetal-response so that, at or near the expiration of its brief thermal transient, it will attain a sufficient temperature-gradient over the normal-load-oil-temperature of the transformer, to produce the desired signaling or tripping temperature of the bimetal member, when the transformer is subjected to the overload $NI_n$ after having been operating under normal load-conditions.

A further object of our invention is to provide means whereby the copper is permitted to reach an abnormally high temperature when the transformer is subjected to a high useful overload for only a moderate time of the order of one-half hour to one hour, more or less, or, say, from twenty minutes to two hours or the like, so as to take advantage of the fact that the transformer insulation can stand a higher temperature for a short period of time than it can for a longer or continuous period. In order to accomplish this purpose of our invention, we have found that it is necessary to depart from our previous idea that the most desirable thermal protection would be accomplished by tripping the load at a given maximum temperature of the winding regardless of the duration of the excess-temperature condition and regardless of the ambient temperature. We accomplish our increase in the moderate-time overload-capacity of the transformer by designing our thermal element and our transformer so that the temperature-gradient of the thermal element increases less rapidly than the temperature-gradient of the copper, as the maximum permissible long-maintainable overload becomes greater as a result of a decrease in the ambient temperature.

Still further objects of our invention relate to the application of the bimetal-transient feature, or the feature respecting the border-line between immediate thermal response and a thermal response which depends upon the heating of the oil, to a transformer which is designed either to be compensated for ambient temperature-conditions or to provide an increased moderate-time overload-capacity.

With the foregoing and other objects in view, our invention consists in the apparatus, combinations, systems and methods hereinafter described and claimed, and illustrated in the accompanying drawing wherein:

Figure 1 is a diagrammatic cross-sectional view of a distribution-transformer embodying our invention, Fig. 2 is a similar view of a power-transformer embodying our invention, and Figs. 3, 4, 5 and 6 are detailed cross-sectional views showing various forms of embodiment of the bimetal member which we utilize.

In Fig. 1, our invention is illustrated as being embodied in a transformer comprising a metal tank or casing 1, which may be grounded at 2, containing oil 3, or other liquid dielectric, in which is immersed the transformer-core 4, carrying the transformer-coils comprising the low-voltage winding 6 and the high-voltage winding 7. The coils 6 and 7 are made of insulated wires of copper or other electrical conductor, these wires being suitably insulated from each other and from the core 4 and the tank 1. In general, a certain amount of internal cooling is provided in the form of oil-ducts 8 which are disposed within the interior or mass of the coils 6 and 7, in order to decrease the temperature-gradient between the copper and the oil.

We also provide a bimetal, or other thermally-responsive, member 10 which is immersed in the oil 3, or, more generally speaking, which is in heat-exchanging relation to the oil 3. The bimetal-member 10, in the illustrated embodiment, is provided with one or more projections or catches 11 which cooperate with a signaling-latch 12 and a tripping-latch 13 which are so adjusted that, as the bimetal member 10 is heated, and bends to move its catch 11 away from latching engagement with the latches 12 and 13, the signaling-latch 12 will be released at a temperature some 30° C. (or other desired amount) sooner than the tripping-latch 13.

The general construction of the bimetal-member 10 and the signaling and tripping latch-mechanisms which are schematically illustrated at 12 and 13, may take the form of any approved construction, such as that which is shown in a Patent No. 2,169,586, granted to Merrill G. Leonard on August 15, 1939, and assigned to the Westinghouse Electric & Manufacturing Company. For the purpose of illustrating the principles of our present invention, this mechanism is illustrated very schematically in Fig. 1, showing that the signaling-latch 12, when released from the bimetal-catch 11, moves under the influence of a biasing-spring 14, to close a control-circuit contact 15, which thereupon locks itself closed, even though the bimetal-member 10 should subsequently cool off again. In like manner, we have diagrammatically illustrated our tripping-latch 13 as operating under the influence of a biasing-spring 16, upon being released from the bimetal-catch 11, so as to open the main tripping-contacts 17 which may be any circuit-breaker contacts.

In the form of our invention which is shown in Fig. 1, a high-voltage or primary circuit is shown, comprising an incoming lead 20 which enters the casing 1 through a bushing 21, and which is protected against excess-voltage surges by means of a suitable self-clearing or valve-type lightning arrester or excess-voltage protective device 22 which is illustrated as being connected to the high voltage lead 20 at a point 23 inside the tank 1, the other terminal of the arrester 22 being grounded, as by means of an electrical connection to the tank. The primary lead 20 now passes on, through a primary fuse 24, to the high-voltage winding 7, the other terminal of which is connected to a second primary lead 25 which is brought outside of the tank 1 through a bushing 26. In the illustrated form of embodiment of our invention, the second primary lead 25 is illustrated simply as being grounded at 27, although it will be understood that any other return-circuit connection may be made for completing the primary circuit through the high-voltage windings 7.

In the form of embodiment of our invention which is illustrated in Fig. 1, one terminal of the secondary, or low-voltage, winding 6 is connected to a secondary lead 30 which is connected to the bimetal-member 10, to pass current therethrough, after which it is extended, through a conductor 31, to the main circuit-breaker contacts 17, after which this secondary lead is extended as a conductor 32 which leaves the tank 1 through a bushing 33. The other terminal of the secondary winding 6 is illustrated as comprising a secondary lead 34 which leaves the tank 1 through a bushing 35. Before the secondary conductors 32 and 34 leave the tank 1, they are respectively provided with lightning-arrester protection, as illustrated at 36 and 37, respectively.

In the form of our invention which is illustrated in Fig. 1, the signal-circuit contacts 15 are utilized to energize an externally visible lamp 40 from a small tertiary winding 41 which is provided on the transformer-core 4 in such position as to be loosely coupled, for high frequency, to the other windings, as described and claimed in an application of John K. Hodnette, Serial No. 350,381, filed August 3, 1940.

In the form of our invention which is illustrated in Fig. 2, the secondary current, instead of passing directly through the bimetal-member 10, is applied thereto through the intermediary of a current-transformer 44; and the tripping contacts 17', instead of being normally closed contacts which are directly included in series with the secondary circuit 30—31—32, are normally open contacts which are utilized to control the energization of the trip-coil 45 of a separate secondary circuit-breaker 46 which is mounted in a separate compartment 47 of the transformer, rather than being disposed in the compartment which contains the oil 3. Energy for both the trip-coil 45 and the signal-light 40 is obtained, in Fig. 2, from an auxiliary potential-transformer 48.

In analyzing the applications of our present invention, it is necessary to consider the various temperature-conditions existing in the transformer under two different operating-conditions, that is, both during normal conditions and during the maximum-temperature steady-state, or continuous-operation, conditions. The normal conditions may be regarded as operation at the full rated or "normal" load-current $I_n$. Under the normal load-condition the final, or steady-state, value of the copper-temperature $T_c$ (as determined by the resistance of the high-voltage winding) is higher than the oil-temperature $T_o$ by the normal gradient, which we call $K$ (expressed in ° C.). In the past, the transformer-gradient $K$ has been something like 5° C. in so-called "low-gradient" transformers, and something like 10° C. in the less expensive so-called "high-gradient" transformers. This transformer temperature-gradient $K$ is variable by changing the oil-duct areas, or by changing the number of oil-ducts interspersed in or between the windings of the transformer or by changing the current-density. The standard, or officially recognized, maximum-temperature condition for normal load has usually been specified as 95° C., (55° C. rise, plus 40° ambient temperature); but, in the copper-temperature-controlled transformers of the type shown in the before-mentioned copending Putman application, it has been demonstrated, by actual use, that it is safe to specify this maximum temperature as 120° C., for the maximum steady-state or trip-out copper-temperature $T_{ct}$ when the transformer is working at, or very close to, the trip-out condition, continuously carrying the highest permissible overload $L_t I_n$.

In copper-temperature-protected transformers prior to our present invention, the design was commonly made in such manner that the copper-temperature $T_c$ always had approximately the same maximum or tripping value $T_{ct}$ whenever the bimetal member reached its steady-state tripping temperature $T_{bt}$, at least for overload-times of one hour and longer times, regardless of ambient temperature-conditions. In order to hold the copper-temperature $T_c$ to the same limiting trip-out value $T_{ct}$, summer or winter, that is, regardless of the ambient temperature, it was necessary to design the transformer and/or the bimetal element so that the rates of change of their temperature-gradients with changing loads should be approximately equal at their respective maximum-load temperatures, the maximum load of the transformer being the maximum permissible steady-state load $L_t I_n$, which is high when the ambient temperature is low, and vice versa. In other words, when the temperature $T_{ot}$ which the oil reaches at the trip-out point is lower, because of a lower ambient temperature, the maximum permissible steady-state load-current $L_t I_n$ is larger.

In general, the steady-state condition of a transformer, after the oil has reached its final, steady temperature corresponding to any constant continuous load $L I_n$, is commonly regarded as being expressed by the following equation approximately defining the copper temperature-gradient $G_c$, or the temperature-difference between the copper and the oil, hereinabove referred to as the temperature-gradient of the transformer:

$$G_c = T_{cL} - T_{oL} = KL^x \qquad (1)$$

where $T_{cL}$ and $T_{oL}$ are, respectively, the copper-temperature and the oil-temperature corresponding to the load $LI_n$; $K$ is the normal-load temperature gradient of the transformer; and $x$ is a radiation-constant ranging from 1.5 to 2, usually having a normal-load value of the order of 1.6 or 1.7, but usually approximating $x = 2$ in the useful-overload range in which the design-engineer is primarily interested when determining the relative gradients of the thermal element and the transformer-copper or windings.

If it is stipulated that the copper-temperature $T_{cL}$ shall have the constant maximum permissible value $T_{ct}$ at all ambient-temperature conditions, and at the maximum permissible long-time loadings $L_t$, the maximum loading $L_t$ being varied inversely, when the ambient temperature varies, so as to hold the copper-temperature $T_{cL}$ constant at the maximum continuous permissible or trip-out copper-temperature $T_{ct}$, we can determine the relative rates of change of the trip-out oil-temperature $T_{ot}$ with respect to the loading $L_t$, and the maximum permissible steady, or trip-out, load $L_t I_n$. Thus, the copper-gradient under steady-state maximum-load conditions is $$G_{ct} = T_{ct} - T_{ot} = KL_t^x \qquad (2)$$

Differentiating, and remembering that $T_{ct}$ is a constant, $$\frac{dG_{ct}}{dL_t} = -\frac{dT_{ot}}{dL_t} = xKL_t^{x-1} \qquad (3)$$

which represents the rate at which the oil-temperature decreases, or the rate at which the maximum-load copper temperature-gradient ($G_{ct} = KL_t^x$) increases, in relation to an increase in the maximum permissible load $L_t I_n$, so as to maintain the same trip-out copper-temperature $T_{ct}$ regardless of ambient-temperature conditions.

If, now, the bimetal member is to have a continuous-load tripping-temperature $T_{bt}$ which causes the copper to always reach the maximum permitted continuous-load copper-temperature $T_{ct}$ regardless of ambient temperatures, it follows that the trip-out bimetal temperature-gradient $G_{bt}$ must increase at the same rate as the maximum-load copper-gradient $G_{ct}$, in relation to the maximum permissible load $L_t I_n$, as affected by ambient temperatures, or $$dG_{bt}/dL_t = dG_{ct}/dL_t$$

Since we are now considering long-continued loads, we may, at present, disregard the transient conditions, when the bimetal-gradient $G_b$ was first changing, when current was first applied thereto, and we may properly consider only the steady-state thermal equation expressing the tripping-condition of the bimetal member. Assuming, by way of illustration, that the maximum permissible continuous transformer-current $L_t I_n$ passes directly through the thermal element, without the intermediary of a current-transformer, a current-shunt, or a separate current-responsive heater, the border-line or trip-out bimetal-gradient $G_{bt}$ is $$G_{bt} = T_{bt} - T_{ct} = \frac{L_t^2 I_n^2 R}{aq_L} \qquad (4)$$

where $T_{bt}$ is the tripping temperature of the bimetal member, $T_{ot}$ is the continuous-load trip-out temperature of the oil under various ambient-temperature conditions, $R$ is the bimetal resistance, $a$ is the effective heat-dissipating area of the bimetal member, and $q_L$ is the coefficient of heat dissipation between the bimetal member and the oil, when the oil is at the hot temperature $T_{ot}$, $q_L$ being expressed in watts per unit area per unit temperature-gradient.

The rate of change of the trip-out bimetal-gradient $G_{bt}$ under various maximum permissible continuous loads $L_tI_n$, as affected by ambient-temperature conditions, is obtained by differentiating Equation 4. Thus $$\frac{dG_{bt}}{dL_t} = -\frac{dT_{ot}}{dL_t} = \frac{2L_tI_n^2R}{aq_L} \qquad (5)$$

To eliminate the effect of ambient-temperature conditions on the copper-temperature at which trip-out occurs, we equate Equations 3 and 5 in order to hold the copper-temperature $T_c$ to the same limiting trip-out value $T_{ct}$, summer or winter, that is, regardless of the ambient temperature. Thus it is necessary to design the transformer and/or the bimetal element so that the rates of change of their maximum-load temperature-gradients, with changing maximum loads corresponding to changing ambient temperature, should be approximately equal. We thus obtain $$K = \frac{2L_t^{2-x}I_n^2R}{xaq_L} \qquad (6)$$

which represents the normal-load transformer-temperature gradient $K$ necessary to make the maximum-continuous-load tripping independent of the ambient temperature, for any given radiation-constant $x$ of the transformer, and any given resistance $R$ and heat-dissipation gradient $aq_L$ of the bimetal member.

Substituting the approximation $x=2$, which is applicable in the useful-overload range which we are considering, Equation 6 becomes $$K = \frac{I_n^2R}{aq_L} \qquad (7)$$

Equation 7 expresses the design-relationship, heretofore known, for producing a copper-temperature-controlled transformer in which the effect of ambient temperature has been eliminated. Equations 6 and 7 state that the copper gradient $KL^2$ and the bimetal gradient $I_n^2L^2R/aq$ are equal to each other, which is to say that the bimetal-member, or thermally responsive member, is always at the same temperature as the copper, at least within the range of the fundamental equations on which Equations 6 and 7 are based, that is, for steady-state operating-conditions. At first, this method of protecting a transformer was considered to be scientifically sufficient and correct, since it tripped out the breaker, or was supposed to do so, theoretically, whenever the copper reached a maximum predetermined safe steady-state temperature $T_{ct}$, under all possible ambient-temperature conditions.

In practice, however, it has been found that transformers equipped with this kind of protection would not carry as high short-time overloads as operating companies had been in the habit of imposing upon transformers which were not thermally protected. Various kinds of tests have given evidence, moreover, that the life of electrical insulation is deleteriously affected by the time of exposure to excessive temperatures, as well as by the temperatures themselves, and that electrical insulation will safely withstand short-time exposures to temperatures which are higher than other temperatures, which, if continuously maintained, say, for many hours or days, would seriously damage, and possibly finally destroy, the insulation.

Through considerable study and experimental work, we have discovered a method or methods, and means, for permitting these short-time overloads, without impairing the protection of the transformer.

In accordance with one feature of our present invention, we have devised an additional design-limitation, or modified means, which may be utilized either in addition to, or independently of, the ambient-free limitation expressed by Equations 6 and 7, and which makes it possible for the transformer-copper to reach higher temperatures for one minute's time, or less, and therefore making it possible for the transformer to carry higher momentary loads without tripping the breaker. In accordance with this aspect of our invention, we design the bimetal member in such a manner as to emphasize, or augment, the transient part of the bimetal heating-period, when the electrical-energy input into the bimetal member is being used up in storing heat in the bimetal-mass. This may be explained as follows.

If a current having a constant root-mean-square value $I$ is introduced, or caused to flow, for some time $t$, in a bimetal member having a resistance $R$ and immersed in oil at a temperature $T_0$, the electrical-energy input $W = I^2R$ will partly heat the bimetal member and will partly be dissipated to the oil. The bimetal member will be heated by an amount $(T_b - T_0)$, with a thermal-energy input $(T_b - T_0)pm$, dependent upon the specific heat $p$ and the mass $m$ of the bimetal member. The bimetal member will dissipate thermal energy to the oil, during any brief time $dt$, in an amount dependent upon its momentary temperature-difference or temperature-gradient $G_b = (T_b - T_0)$ and its rate of heat-dissipation $aq$, where $a$ is its effective heat-dissipating area and $q$ is its coefficient of heat-dissipation in watts per unit area per unit temperature-gradient, at the normal oil-temperature $T_0$. Thus, the total energy, over a period of time $t$, is given by $$Wt = pm(T_b - T_0) + \int_0^t (T_b - T_0)aq\,dt \qquad (8)$$

Differentiating Equation 8 with respect to $t$, and noting that the oil-temperature $T_0$ remains substantially constant during the brief temperature-transient of the bimetal member, while heat is being stored in the bimetal member as thermal energy $(T_b - T_0)pm$, $$W\,dt = pm\,dT_b + (T_b - T_0)aq\,dt$$

whence $$\frac{dT_b}{dt} + \frac{aq}{pm}T_b = \frac{W}{pm} + \frac{aq}{pm}T_0 \qquad (9)$$

By integration, and substituting $W = I^2R$, the temperature $T_b$ of the bimetal member, at any time $t$, will be found to be $$T_b = T_0 + \frac{I^2R}{aq}\left(1 - \epsilon^{-\frac{aqt}{pm}}\right) \qquad (10)$$

After the expiration of the transient $$\frac{I^2R}{aq}\epsilon^{-\frac{aqt}{pm}}$$

the bimetal member assumes a temperature-gradient $G_b=(T_b-T_o)$ which, neglecting any small change in bimetal-resistance with temperature, is constant as long as the current-input I remains constant, notwithstanding the fact that the oil-temperature $T_o$ gradually increases as the load-current continues to be passed through the transformer-windings. This steady state temperature-gradient $G_b$ between the bimetal member and the oil is expressed by the equation $$G_b = T_b - T_o = \frac{I^2R}{aq} \qquad (11)$$

An important discovery of our present invention is that, if we decrease the rate of electrical energy-input into the bimetal member by decreasing its resistance, and if we effect a corresponding decrease in its heat-radiation constant $aq$, we can secure increased short-time loadings, in the time-range up to about a minute, without affecting the longer-time operation which, as shown in Equation 7, is dependent upon the value of the ratio $$\frac{I_n^2R}{aq_L}$$

The heat-dissipation coefficients $q$ and $q_L$ are substantially the same, there being only a slight change due to the difference in oil-viscosity at higher temperatures.

A mathematical explanation of this phenomenon is to be found in Equation 10, from which it will be seen that the only transient factor is $$\epsilon^{-\frac{aqt}{pm}}$$

Ordinarily this transient reduces to a negligible point in something like $t=15$ seconds, but, in accordance with one phase of our invention, it can be strengthened and prolonged, say, so that it will decrease to 36.8% of its initial value in from 30 to 60 seconds, or even a longer time, which is another way of saying that the bimetal member reaches 63.2% of its steady-state temperature-gradient in 30 to 60 seconds, or more. Since this condition is reached when the exponent of $\epsilon$ is $-1$, that is another way of saying that $pm/aq=$ from 30 to 60, or more. This long transient condition may be obtained by decreasing the effective heat-radiating area $a$ of the bimetal member, by decreasing its rate $q$ of heat-dissipation per unit area per degree, by choosing a bimetal member having a higher specific heat $p$, or by increasing the bimetal-mass $m$ which is to be heated, or by a combination of these methods. In this way, we have found that we can double the amount of load which the transformer is permitted to carry for anywhere from 1/100 second to sixty seconds, without a breaker-tripping operation of the thermal element; thereby permitting the transformer to feed a service having an unusually high breaker-setting, or to feed a network where it is desired to burn off faults in the network without tripping the breakers.

Also in accordance with this aspect of our invention, that is, that part of our invention which relates to short-time overloads requiring from one to sixty seconds to trip the thermal element, we have discovered that it is possible to take advantage of the fact that the bimetal member attains its steady-state gradient $G_b=T_b-T_o$ very quickly, or within about a minute or less, after the application of a current-increment I, without waiting for the long oil-heating transient during which the transformer-oil is heating, while the transformer-load is being maintained for relatively longer periods of time, such as minutes or hours.

Thus, we have discovered that it is possible to design the bimetal member so that it will reach its tripping temperature $T_{bt}$ immediately upon the subsidence, or the approximate subsidence, of the transient $$\frac{I^2R}{aq}\epsilon^{-\frac{aqt}{pm}}$$

at a certain predetermined current $NI_n$ which is at the threshold between what may be considered the "useful-overload" range ($I_n$ to $NI_n$) of the transformer, where the load lasts for a matter of minutes or hours, and what may be termed the "short-circuit" range (over $NI_n$), where the current must be interrupted relatively quickly. Assuming that this particular current-value is N times the normal full-load current $I_n$ of the transformer, and assuming, further, that the transformer-current is passed directly through the bimetal member, without the interposition of a current-transformer, or a current-shunt, or a current-responsive heater, it will be seen, from Equation 11, that the quick-tripping operation will be governed by the initial oil-temperature $T_o$ and the bimetal constants $R$, $a$ and $q$, in accordance with the equation $$T_{bt} = T_o + \frac{N^2 I_n^2 R}{aq} \qquad (12)$$

Equation 12 expresses the tripping-temperature $T_{bt}$ of the bimetal member in terms of the normal oil-temperature $T_o$ and the maximum overload $NI_n$ which the transformer will be called upon to carry for one minute or more, or at least for substantially the duration of the brief bimetal-transient $$\frac{N^2 I_n^2 R}{aq}\epsilon^{-\frac{aqt}{pm}}$$

For distribution-transformers, N may be taken as 7, as an illustrative example; while, for power-transformers, a value $n=4$ might be more suitable.

It is noted that Equation 4 gives the value of this same bimetal tripping-temperature $T_{bt}$ in terms of the maximum permissible long-time, or continuous-load oil-temperature $T_{ot}$ and the maximum permissible long-time or continuous load $L_tI_n$ which the transformer can carry without exceeding the highest permissible continuously maintained copper-temperature $T_{ct}$.

In accordance with an aspect of our invention, we can design the bimetal element so as to take advantage of the transient in its temperature-gradient to obtain immediate tripping, or tripping within from one to sixty seconds, at loads in excess of $NI_n$, representing non-permissible overload-conditions or short-circuits on the transformer, while obtaining time-delayed tripping in the useful moderate-time overload-range up to $NI_n$, after a moderate time which is dependent, among other things, upon the rate of rise of the oil-temperature. This special design-condition for giving oil-temperature-responsive tripping for overload-currents less than $NI_n$, and immediate tripping for larger overloads, is obtained by combining Equations 4 and 12, giving $$\frac{R}{aq} = \frac{T_{ot} - T_o}{I_n^2\left(N^2 - \frac{q}{q_L}L_t^2\right)} \qquad (13)$$

This special design of the bimetal or thermally responsive element, to give immediate tripping in the short-circuit range and delayed tripping in the range of useful overloads, as expressed in Equation 13, may be applied to any copper-temperature-protected transformer, that is, any transformer which is protected so as to operate within the permissible limits of its copper-temperature.

We have discovered, as a further part of our invention, that there is a tendency for an ambient-compensated transformer of the type referred to in Equation 6 or 7 to trip itself out prematurely in the higher end of the useful-overload range, that is, when the load-current is not much below the maximum, delayed-tripping, load-value $NI_n$. Another way of saying it is that, for overloads of sufficient magnitude so that they will cause tripping within something like an hour, more or less, there would be a tendency for the transformer to trip out before the copper has reached the maximum permissible continuous-load temperature $T_{ct}$. It will be noted that this range of operation is outside of the scope of the premises upon which Equations 6 and 7 were derived, as these equations were worked out on the basis of always obtaining the same final-state or steady-state maximum copper-temperature $T_{ct}$ after the load had been held steady and maintained so long that the temperatures of the oil and copper would not vary any more. Equations 6 and 7 merely express the condition that the steady-state, long-time or ultimate, temperature of the copper shall always reach the same maximum value $T_{ct}$ regardless of the ambient temperature.

In accordance with this phase of our present invention, we have discovered a means and method whereby we can obtain a thermal response of such nature that the copper will be permitted to reach a temperature which is from 5° to 55° C., or more, hotter than the maximum safe continuous-load value $T_{ct}$, for moderate-time overloads in the range around one hour's time, or from, say, twenty minutes to two hours. We have found that operating companies frequently badly need the full moderate-time load-carrying capacities of transformers, either to take care of moderate-time peak-loads, or to take care of emergency operating-conditions where it may be necessary to overload one transformer for as much as an hour or more, while making emergency-repairs on another transformer or line. We believe that, not only is it highly undesirable, in such cases, to let an ambient-compensated transformer trip out before the copper has reached its continuous-service norm $T_{ct}$, but, on the contrary, it is desirable to let the copper-temperature mount (for moderate time-periods of the order of twenty minutes to two hours) to values appreciably higher than the continuous-service norm $T_{ct}$.

According to this novel feature of our invention, we make the maximum-steady-load bimetal-gradient $G_{bt}$ increase less rapidly than the maximum-steady-load copper-gradient $G_{ct}$, in accordance with any increase in the maximum permissible steady load $L_tI_n$ which is made possible by a decrease in the ambient temperature, thus losing, to some extent, the advantage of ambient-temperature compensation which was obtained by Equation 6, but gaining an increased moderate-time overload-capacity. When such moderate-time (say, one-hour) overload-capacity is needed, in accordance with our invention, we make $$\frac{2L_t^{2-x}I_n^2R}{xaq_L} < K \tag{14}$$

or, if $x=2$, as is usually the case, approximately, $$\frac{I_n^2R}{aq_L} < K \tag{15}$$

Inequalities 14 and 15 state that the temperature-gradient between the copper and the oil should be higher than the temperature-gradient between the bimetal-member and the oil, which is to say that the bimetal-member should be cooler, rather than at a temperature-parity with the copper as in Equations 6 and 7. It will be noted that this inequality in the temperature-gradients lengthens the time required for the bimetal-member to attain its latch-releasing or tripping temperature whenever the overload condition in question started from a bimetal-temperature (or oil-temperature) which was relatively cool, as when the transformer had been lightly loaded prior to the occurrence of the overload-condition, or during winter when the oil runs cooler than in summer. This is so, because the tripping-temperature of the bimetal-member is chosen so that the copper-temperature will just reach its maximum safe steady-state value, that is, the value which it will reach after a long period of operation, longer than two hours, so that the oil will have had time to reach, or approach close to, its steady-state value, which means that the copper and bimetal gradients are both relatively small, the oil being hot. Hence the copper is permitted to get hotter when the bimetal has to be heated to a higher temperature-gradient above the oil-temperature, because the copper-temperature rises faster than the bimetal-temperature, thus giving the transformer the required short-time overload-capacity for short-time overloads when the oil is cooler and the copper and bimetal gradients are larger than under the steady-state conditions.

Our reason for resorting to the Inequality 14 or 15 is that we have found that the slow oil-heating transient, as well as the copper-heating transient, which are not expressed in Equation 1 or Equation 2, are of such nature that the Inequality 14 or 15 will produce a hump in a curve which expresses the relation between the trip-out copper-temperature $T_{ct}$ and the time or duration of the overload-condition before tripout, and this hump, or increased copper-temperature, occurs in the range of heavy useful overloads which result in tripping in from about half an hour to an hour, more or less, depending upon the temperature-curve constants of the transformer, said hump spreading out to embrace overload-durations of from 20 minutes to 2 hours, or more. We have found that we can thus produce a hump at about the point where otherwise, in a design where better ambient-temperature compensation was obtained, there would, or might, have been a falling off in the trip-out copper-temperature $T_{ct}$ because of the nature of the slow oil-temperature and copper-temperature transients.

More specifically, in accordance with this aspect of our invention, we make $$\frac{I_n^2R}{aq_L} \text{ less than } K$$

by an amount which will limit the maximum copper-temperature $T_{ct}$ for moderate-time overloads to a value within the range of 125° to 175° C., or other safe or permissible moderate-time copper-temperature. On the basis of a 120° C. maximum continuously maintained copper-temperature $T_{ct}$, for indefinitely long-continued loading-conditions, the foregoing statement is equivalent to saying that we design our transformer so that the highest copper-temperature $T_{ct}$ (as determined by the resistance of the winding, either low-voltage or high-voltage) will get hotter, by a safe or permissible amount, such as from 5° to 55°, or more, for overload-conditions lasting only a moderate time, such as a half-hour or an hour, than is permitted for long-continued overloads or for continuous steady-state maximum-temperature operation. In general, since making this invention, we now design power-transformers for a small moderate-time temperature-rise, such as 10° or 15%, or other value approaching the lower limit of the above-indicated moderate-time temperature-range; and we now design the smaller sizes of distribution-transformers so as to more nearly approach the upper limit specified. In any event, this moderate-time hump in the maximum attained copper-temperature occurs for heavy overloads lasting for a time which is considerably shorter than the time-constant of the oil-temperature transient, which may be regarded as something like 4 to 6 hours in an illustrative example. The duration of these heavy overloads is also generally less than the time-constant of the copper-temperature transient, which may be regarded as 2¾ hours in a typical or illustrative transformer having a 4-hour oil-temperature constant.

In some transformers, it is necessary (because of the magnitude of the transformer load-current $LI_n$), or it may be desirable, because of the greater freedom of design in properly choosing the different design-constants, to go to the expense of providing some sort of current-divider, or other agency, for causing the heating in the bimetallic (or other thermally responsive) member to be less than $L^2 I_n^2 R$. In such cases, we may substitute $kI^2R$ for $I^2R$, in all quantities involving the electrical heating of the bimetal element, so that the novel design-principles of our invention, as expressed in Equation 13 and Inequalities 14 and 15, become, respectively, $$\frac{kR}{aq} = \frac{T_{ot} - T_o}{I_n^2 \left( N^2 - \frac{q}{q_L} L_t^2 \right)} \quad (16)$$

for controlling the immediate-tripping zone for transformer-currents in excess of $NI_n$; and $$K > \frac{2kL_t^{2-x} I_n^2 R}{xaq_L} \quad (17)$$

and $$K > \frac{kI_n^2 R}{aq_L} \quad (18)$$

for obtaining higher copper-temperatures for moderate-time overloads. The bimetal-wattage factor $k$ does not affect the prolongation or enlargement of the bimetal transient-factor $$\epsilon^{\frac{-aqt}{pm}}$$

in Equation 10, except as it may make it easier to modify the physical size of the bimetal member so as to have a better control over the contacts $a$, $q$ and $m$.

Going back, now, to the quantity $$\frac{I_n^2 R}{aq_L}$$

which, in an ambient-compensated design, is to be made equal to the normal-load temperature-gradient K of the transformer, as expressed in Equation 7, and which, in our new design for obtaining increased moderate-time overload-capacity, is less than the transformer-gradient K, as expressed in the Inequality 15, it is apparent that required relationships may be brought about by varying either the resistance R of the bimetal member, if that be possible, or by increasing the watts $aq_L$ which are lost from the bimetal member to the oil for each degree centigrade of the temperature-gradient between the bimetal member and the oil. In cases in which it is practical, or economical, to introduce a heating coefficient $k$, either as a result of utilizing a current-shunt, a current-transformer, or a separate current-energized heater in heat-exchanging relation to the bimetal member, this expression becomes $$\frac{kI_n^2 R}{aq_L}$$

in which case we would have the further choice of varying the heating-coefficient $k$, as a means for properly selecting the design-constants of the bimetal member.

In a small distribution transformer, the resistance R of a satisfactory bimetal member is something like 0.00025 ohm, which is so small that a current-shunt around the bimetal member is obviously impracticable. In these small transformers, a current-transformer is usually ruled out because of cost-considerations. For larger transformers, the resistance R of an acceptable bimetal member would be still smaller, being usually less than 0.0002 ohm in transformers of 25 kva. and over. There are only five or six available bimetal-alloys or combinations which are acceptable for our bimetal-member 10, and these different materials have different specific resistances, of which advantage can be taken in controlling the bimetal-resistance R. This bimetal-resistance R is also affected by the thickness of the bimetal member, being smaller when the bimetal-thickness is increased, but a thicker bimetal-member means less movement of the bimetal-member, and we have not found it practicable or satisfactory to utilize a movement of less than one-tenth of an inch for each 100° C., as otherwise it will be impossible to build the bimetal control-element, so as to be accurately responsive within several degrees centigrade. The lowest bimetal-resistance R to which we have ever dared go is 0.000123, and that bimetal-member gave us some trouble.

Considering, therefore, the practical necessity for varying the bimetal heat-dissipating rate $aq_L$, the usual means for correlating the bimetal-design with the transformer-gradient K, we have successfully tried out four different methods for increasing or decreasing the bimetal dissipating-constant $aq_L$, as illustrated in Figs. 3 to 6, respectively.

As shown in Fig. 3, we have oriented the thermal-breaker housing in such a way that the bimetal-member 10 stands vertically in the oil, and we have then opened the bimetal-housing 50 at both the top and the bottom, as indicated at 51 and 52, to produce a definite flow of oil around or over the bimetal member 10, as indicated by the arrows 53. By this method, we have been able to effect a 36% increase in the bimetal-constant $aq_L$.

In the bimetal-designs shown in Figs. 3, 4, 5 and 6, the bimetal-member 10 is enclosed in a housing 50, and the bottom end of the bimetal-member 10 is adjustably or pivotally connected to the housing 50, as indicated at 54, the pivotal adjustment being controlled by means of a stiff arm 55, the top end of which is adjustable by means of a nut or adjusting screw 56 on a pin 57 which is surrounded by a compression-spring 58, so that the adjusting arm 55 is held between the nut 56 and the spring 58. In this way, it is possible to control or adjust the bimetal-temperatures at which the catch 11 releases the signaling-latch 12 and the tripping-latch 13.

Fig. 4 shows a bimetal-construction in which the bimetal-member 10 is taped or covered with a suitable covering 60. If this covering is of a heat-insulating material, such as ordinary insulating tape, the bimetal heat-dissipating constant $aq_L$ is decreased. If this coating 60 is of some heat-conducting material, such as metal braid, the bimetal-constant $aq_L$ is increased. Even glass tape or braid, although not a very good heat-conductor, was found to give a 2% increase in the value of $aq_L$, apparently because of increasing the effective heat-dissipation surface or area $a$ in contact with the oil.

Figs. 5 and 6 show methods of increasing the bimetal-constant $aq_L$ by increasing the effective heat-radiating area $a$ of the bimetal-member 10. In the construction shown in Fig. 5, additional heat-radiators 61 are connected to the bimetal-member 10 at its respective ends, so as not to interfere with the flexibility of the bimetal-member. In the construction shown in Fig. 6, the heat-radiating fins 62 are transverse fins which are brazed or welded to the bimetal-member 10, so as to increase the radiation of heat to the oil without seriously interfering with the flexibility of the bimetal-member.

In certain phases of our invention it is desirable to make the bimetal-constant $aq$ smaller than it would normally be, as explained in connection with Equation 10, where it is desired to increase and lengthen the bimetal-transient factor $$\epsilon^{\frac{-aqt}{pm}}$$

in order to increase and lengthen the short-time overload-capacity of the transformer, permitting the transformer to carry more short-time loads before the operation of the signaling or tripping latches 12 and 13 of the thermally-responsive apparatus. In such cases, cotton tape 60, applied as shown in Fig. 4, has been found practicable. The porosity of the tape appears to be a desirable feature, as it tends to hold a certain amount of oil in close contact with the bimetal member, so as to prevent circulation. In this way, we have effected a 29% decrease in the bimetal-constant $aq$. The constant $aq$ is also decreased by closing the top and bottom openings 51 and 52 which are shown, in the bimetal-casing 50, in Fig. 3, the closure of these openings resulting in a still further decrease of 21% in the value of the bimetal heat-radiating constant $aq$.

For economic or other reasons, it may be necessary to design certain transformers so as to have a high winding-gradient K, and hence a copper-gradient which increases rapidly with load, as will be seen from Equation 2. In such a case, it may be found that a bimetal-resistance R which would give the desirable overload-characteristics, as explained hereinabove, would be so high as to be outside of the scope of the available bimetal-materials, with any ordinarily available values of the bimetal heat-radiating constant $aq$. Also this high resistance may be objectionable, as it adds to the impedance or losses of the transformer. As previously intimated, the bimetal-resistance R cannot be increased beyond a certain point, by reducing the cross-section of the bimetal-member, because this also reduces the mechanical strength of the bimetal-member, and the mechanical strength determines the permissible contact-pressure which may be utilized between the latches 12 and 13 and the catch 11, and it obviously affects the required margin of sensitivity to small temperature-changes. In such a case, instead of increasing the bimetal-resistance R, it would be obviously desirable, in accordance with our invention, to decrease the bimetal radiation-constant $aq$ by wrapping the bimetal-member 10 with insulating material 60 and/or enclosing it in a tight cover 50' in the manner shown in Fig. 4.

A practical example of a type of transformer where the design-principles just mentioned are involved, is to be found in a small distribution-transformer from 1½ to 3 kva. rating, for rural-line application. Here, low cost and selling price are paramount considerations, so that a high gradient K would be desirable for reasons of economy. This high gradient K limits the overload-capacity $L_tI_n$, but, in such rural applications, the limited overload-capacity would still be adequate. However, the very fact that the overload-capacity of the transformer is limited constitutes an important reason for having adequate thermal protection, which, if obtained, would undoubtedly involve the expedient of wrapping the bimetal-member and enclosing it in a tight cover to restrict the oil-circulation and reduce the thermal radiation-gradient $aq$.

While we have described our invention with the aid of mathematical formulae, and in accordance with our best present understanding of the design-theories which are involved, we wish it to be understood that we are not altogether limited to any particular formulae or theories. It will be noted, for example, that certain equations, such as 10, 13 and 16, or the equations, such as 4 and 12 on which they are based, involve expressions for a critical control-function or force, represented by $T_b$ or $T_{bt}$, which is dependent upon a certain response to the oil-temperature $T_o$ or $T_{ot}$, plus a certain cumulative response to current, as found, for example, by current-responses such as $$\frac{I^2R}{aq}\left(1-\epsilon^{\frac{-aqt}{pm}}\right), \frac{L_t^2I_n^2R}{aq_L}, \text{ or } \frac{kN^2I_n^2R}{aq}$$

We desire, therefore, that our mathematical and theoretical explanations, as well as the illustrative means or forms of embodiment which we have shown, shall be regarded as representative of means, broadly, for performing these separate functions or responses to oil-temperature and current, and performing a certain signaling or tripping operation in response to the cumulative sum of these two responses.

Certain of the basic principles of transformer-loading by copper-temperature, as understood prior to our present invention, and also certain mathematical functions or theoretical considerations leading up to some, but not all, of the novel features of our present invention, as herein described and claimed are set forth in a paper by Henry V. Putman and Walter M. Dann, published in Electrical Engineering, October, 1939, page 504.

While we have described and illustrated our invention in connection with only a few illustrative forms of embodiment thereof, we desire such description and illustration to be construed in an illustrative, rather than a limiting sense, as the skilled workers of the art will readily understand the possibility of making many changes, by way of addition, omission, or substitution, without departing from the broader aspects of our invention. We desire, therefore, that the appended claims shall be accorded the broadest construction consistent with their language and the prior art.

We claim as our invention:

1. In combination, an electrical transformer comprising a container, a liquid dielectric therein, current-carrying, insulated electrical-conductor coils immersed in said dielectric, control-means, means for developing a first actuating-force operative on said control-means in response to the temperature of said dielectric, means for developing a second actuating-force operative on said control-means in response to a current in said coils, said last-mentioned means having a delayed action requiring a time of the order of a minute to reach 63% of its maximum steady-state response to a changed value of current, said first and second actuating-forces being so balanced that the ratio of the second actuating-force to the first actuating-force is smaller than the ratio of the rate of electrical heat-input into the conductor to the rate of heat-radiation from the conductor to the liquid dielectric so that the conductor is permitted to attain an abnormally high temperature for heavy overloads lasting for materially less than 2 hours as compared to its temperature for smaller overloads lasting for materially more than 2 hours, the critical response-condition of the control-means being the same in each case, and means responsive to a predetermined response of said control-means while said electrical transformer is in useful operation.

2. In combination, an electrical transformer comprising a container, a liquid dielectric therein, current-carrying, insulated electrical-conductor coils immersed in said dielectric, control-means, means for developing a first actuating-force operative on said control-means in response to the temperature of said dielectric, means for developing a second actuating-force operative on said control-means in response to a current in said coils, said last-mentioned means having a delayed action requiring a time of the order of a minute to reach 63% of its maximum steady-state response to a changed value of current, said first and second actuating-forces being so balanced that the ratio of the second actuating-force to the first actuating-force is smaller than the ratio of the rate of electrical heat-input into the conductor to the rate of heat-radiation from the conductor to the liquid dielectric so that the conductor is permitted to attain an abnormally high temperature for heavy overloads lasting for materially less than 2 hours as compared to its temperature for smaller overloads lasting for materially more than 2 hours, the critical response-condition of the control-means being the same in each case, and means responsive to a predetermined response of said control-means while said electrical transformer is in useful operation, the second actuating-force being sufficiently small, relative to the temperature-gradient between the coil-conductor and the liquid dielectric, so that any given long-time response of the control-means, for loads enduring for more than two hours, would be obtained at a higher conductor-temperature when the liquid dielectric is relatively cool than when it is relatively warm, and the resultant effects of the two actuating forces being to cause said control-means to reach its aforesaid predetermined response in a time which approximates a constant fixed relation to the time that the transformer can safely carry the given overload, both for overloads of such intensity that the limiting time is of the order of slightly more than a minute, and for smaller overloads that may be left on for more than two hours, and also for intermediate loads which may safely be left on for a maximum time of the order of an hour.

3. In combination, an electrical transformer comprising a container, a liquid dielectric therein, current-carrying, insulated electrical-conductor coils immersed in said dielectric, a thermally responsive member in heat-exchanging relation to said dielectric, electrical heating-means for heating said thermally responsive member in response to a current in the coils at a rate which is sufficiently small, in comparison to the amount of heating-energy that is expended in heating the mass of the thermally responsive member, so that the heating-transient lasts for a period of the order of a minute after the occurrence of a heavy overload-current, the rate of heat-exchange between the thermally responsive member and the liquid dielectric, and the rate of current-responsive heating-input into the thermally responsive member, being so balanced that the temperature-gradient between the thermally responsive member and the liquid dielectric is lower than the temperature-gradient between the conductor and the liquid dielectric so that the conductor is permitted to attain an abnormally high temperature for heavy overloads lasting for materially less than 2 hours as compared to its temperature for smaller overloads lasting for materially more than 2 hours, the critical temperature of the thermally responsive member being the same in each case, and means responsive to a predetermined temperature of the thermally responsive member while said electrical transformer is in useful operation.

4. In combination, an electrical transformer comprising a container, a liquid dielectric therein, current-carrying, insulated electrical-conductor coils immersed in said dielectric, a thermally responsive member in heat-exchanging relation to said dielectric, means for causing said thermally responsive member to be heated in response to a current in the coils in addition to the dielectric-responsive heating of said thermally responsive member, the effective heat-dissipating area of the thermally responsive member and the coefficient of heat-interchange between the thermally responsive member and the dielectric being sufficiently small and the specific heat and the mass of the heated material of the thermally responsive member being sufficiently large to cause the current-responsive heating of said thermally responsive member to have a transient which requires a time of the order of a minute to reach 63% of its maximum steady-state response to a changed value of current, the rate of heat-exchange between the thermally responsive member and the liquid dielectric, and the rate of current-responsive heating-input into the thermally responsive member, being so balanced that the temperature-gradient between the thermally responsive member and the liquid dielectric is lower than the temperature-gradient between the conductor and the liquid dielectric so that the conductor is permitted to attain an abnormally high temperature for heavy overloads lasting for materially less than 2 hours as compared to its temperature for smaller overloads lasting for materially more than 2 hours, the critical temperature of the thermally responsive member being the same in each case, and means responsive to a predetermined temperature of said thermally responsive member while said electrical transformer is in useful operation.

5. In combination, an electrical transformer comprising a container, a liquid dielectric therein, current-carrying, insulated electrical-conductor coils immersed in said dielectric, a thermally responsive member in heat-exchanging relation to said dielectric, means for causing said thermally responsive member to be heated in response to a current in the coils in addition to the dielectric-responsive heating of said thermally responsive member, the effective heat-dissipating area of the thermally responsive member and the coefficient of heat-interchange between the thermally responsive member and the dielectric being sufficiently small and the specific heat and the mass of the heated material of the thermally responsive member being sufficiently large to cause the current-responsive heating of said thermally responsive member to have a transient which requires a time of the order of a minute to reach 63% of its maximum steady-state response to a changed value of current, the rate of heat-exchange between the thermally responsive member and the liquid dielectric, and the rate of current-responsive heating-input into the thermally responsive member, being so balanced that the temperature-gradient between the thermally responsive member and the liquid dielectric is lower than the temperature-gradient between the conductor and the liquid dielectric so that the conductor is permitted to attain an abnormally high temperature for heavy overloads lasting for materially less than 2 hours as compared to its temperature for smaller overloads lasting for materially more than 2 hours, the critical temperature of the thermally responsive member being the same in each case, and means responsive to a predetermined temperature of said thermally responsive member while said electrical transformer is in useful operation, the resultant effects of the rate of heat-exchange and the rate of current-responsive heating of the thermally responsive member being such as to cause the continuous-load temperature of the thermally responsive member to be considerably lower than that of the coil-conductor, and also such as to cause said thermally responsive member to reach its aforesaid predetermined temperature in a time which approximates a constant fixed relation to the time that the transformer can safely carry the given overload, both for overloads of such intensity that the limiting time is of the order of slightly more than a minute, and for smaller overloads that may be left on for more than two hours, and also for intermediate loads which may safely be left on for a maximum time of the order of an hour.

6. In combination, an electrical transformer comprising a container, a liquid dielectric therein, current-carrying, insulated electrical-conductor coils immersed in said dielectric, a thermally responsive member in heat-exchanging relation to said dielectric, means for causing said thermally responsive member to be heated in response to a current in the coils in addition to the dielectric-responsive heating of said thermally responsive member, and means responsive to a predetermined temperature of said thermally responsive member while said electrical transformer is in useful operation, the design-constants of the thermally responsive member being such as to approximate the condition $$\frac{kR}{aq} = \frac{T_{0t} - T_0}{I_a^2\left(N^2 - \frac{q}{q_L}L_t^2\right)}$$

where $k$ is the portion of the heating-effect of the square of the transformer load-current which is effective in heating the thermally responsive member, $R$ is the resistance of the thermally responsive member, $a$ is the effective heat-dissipating area of the thermally responsive member, $I_n$ is the normal full-load current of the transformer, $L_t I_n$ is the highest permissible continuously maintained transformer load-current, $N I_n$ is approximately a predetermined limit of moderate-time usable-overload which can be permitted to be applied to the transformer after it has been operating under normal load-conditions, $T_0$ is the steady-state temperature of the dielectric when the transformer is continuously operating at normal load-conditions, $T_{0t}$ is the steady-state temperature of the dielectric when the transformer is continuously operating at the load $L_t I_n$, and $q$ and $q_L$ are the coefficients of heat-exchange between the thermally responsive member and the dielectric under the operating-conditions when the dielectric-temperatures are $T_0$ and $T_{0t}$, respectively.

7. In combination, an electrical transformer comprising a container, a liquid dielectric therein, current-carrying, insulated electrical-conductor coils immersed in said dielectric, a thermally responsive member in heat-exchanging relation to said dielectric, means for causing said thermally responsive member to be heated in response to a current in the coils in addition to the dielectric-responsive heating of said thermally responsive member, and means responsive to a predetermined temperature of said thermally responsive member while said electrical transformer is in useful operation, the transformer having a normal-load steady-state temperature-gradient K which is greater than $$\frac{2kL_t^{2-x}I_n^2 R}{xaq_L}$$

by such an amount that moderate-time overloads on the transformer, lasting for a time in the neighborhood of from one-half hour to an hour, will cause an electrical conductor of the coils to reach a temperature having a maximum value which is hotter, by from 5° to 55° C., than the maximum permissible continuously maintained conductor-temperature which can be permitted when the transformer is continuously operating at the load $L_t I_n$, where K is the steady-state temperature-gradient between an electrical conductor of the coils and the dielectric when the transformer is continuously carrying the normal full-load current $I_n$, $k$ is the portion of the heating-effect of the square of the transformer load-current which is effective in heating the thermally responsive member, R is the resistance of the thermally responsive member, $a$ is the effective heat-dissipating area of the thermally responsive member, $I_n$ is the normal full-load current of the transformer, $L_t I_n$ is the highest permissible continuously maintained transformer load-current, $x$ is the value of an exponent such that $KL_t{}^x$ is the steady-state temperature-gradient between conductor and the dielectric when the transformer is continuously operating at the load $L_tI_n$, and $q_L$ is the coefficient of heat-exchange between the thermally responsive member and the dielectric when the transformer is continuously operating at the load $L_tI_n$.

8. In combination, an electrical transformer comprising a container, a liquid dielectric therein, current-carrying, insulated electrical-conductor coils immersed in said dielectric, a thermally responsive member in heat-exchanging relation to said dielectric, means for causing said thermally responsive member to be heated in response to a current in the coils in addition to the dielectric-responsive heating of said thermally responsive member, the rate of heat-exchange between the thermally responsive member and the liquid dielectric, and the rate of current-responsive heating-input into the thermally responsive member, being so balanced that the temperature-gradient between the thermally responsive member and the liquid dielectric is lower than the temperature-gradient between the conductor and the liquid dielectric so that the conductor is permitted to attain an abnormally high temperature for heavy overloads lasting for materially less than 2 hours as compared to its temperature for smaller overloads lasting for materially more than 2 hours, the critical temperature of the thermally responsive member being the same in each case, and means responsive to a predetermined temperature of said thermally responsive member while said electrical transformer is in useful operation, the rate of increase of the steady-state temperature-gradient of the thermally responsive member with respect to the dielectric, with increasing values of long-continued overloads, being less than the rate of increase of the steady-state temperature-gradient of a conductor of the coils with respect to the dielectric, with increasing values of long-continued overloads, whereby the conductor-temperature, when the transformer is operating on certain heavy overloads maintained for certain times which are considerably less than the dielectric-heating transient of the transformer, reaches a peak value at least 10° C. hotter than when the transformer is operating on less severe overloads maintained for longer times, the thermally responsive element being at a temperature bearing a predetermined relation to its aforesaid predetermined temperature in each case.

9. An electrical transformer having an insulated conductor constituting a winding, a magnetizable core, a cooling and insulating oil, and a tank therefor, in combination with: a thermally responsive device in heat-exchanging relation to the oil; electrical heating-means for heating said thermally responsive device in response to a load-current traversing said conductor; the rate of heat-exchange between the thermally responsive device and the oil, and the rate of current-responsive heating-input into the thermally responsive device, being so balanced that the temperature-gradient between the thermally responsive device and the oil is lower than the temperature-gradient between the conductor and the oil so that the conductor is permitted to attain an abnormally high temperature for heavy overloads lasting for materially less than 2 hours as compared to its temperature for smaller overloads lasting for materially more than 2 hours, the critical temperature of the thermally responsive device being the same in each case; and means responsive to a predetermined temperature of the thermally responsive device while said electrical transformer is in useful operation.

10. In combination: an electrical energy-translating device having an insulated conductor; a cooling medium therefor; a thermally responsive device in heat-exchanging relation to a portion of the cooling medium which has become heated by said energy-translating device; electrical heating-means for heating said thermally responsive device in response to a load-current traversing said conductor; the rate of heat-exchange between the thermally responsive device and the cooling medium, and the rate of current-responsive heating-input into the thermally responsive device, being so balanced that the temperature-gradient between the thermally responsive device and the cooling medium is lower than the temperature-gradient between the conductor and the cooling medium so that the conductor is permitted to attain an abnormally high temperature for heavy overloads lasting for materially less than 2 hours as compared to its temperature for smaller overloads lasting for materially more than 2 hours, the critical temperature of the thermally responsive device being the same in each case; and means responsive to a predetermined temperature of the thermally responsive device while said electrical energy-translating device is in useful operation.

11. In combination: an electrical energy-translating device having an insulated conductor; a cooling medium therefor; a control-means, means for developing a first actuating-force operative on said control-means in response to the temperature of a portion of said cooling medium which has become heated by said energy-translating device, means for developing a second actuating-force operative on said control-means in response to a current in said conductor, said last-mentioned means having a delayed action requiring a time of the order of a minute to reach 63% of its maximum steady-state response to a changed value of current, said first and second actuating-forces being so balanced that the ratio of the second actuating-force to the first actuating-force is smaller than the ratio of the rate of electrical heat-input into the conductor to the rate of heat-radiation from the conductor to the cooling medium so that the conductor is permitted to attain an abnormally high temperature for heavy overloads lasting for materially less than 2 hours as compared to its temperature for smaller overloads lasting for materially more than 2 hours, the critical response-condition of the control-means being the same in each case, and means responsive to a predetermined response of said control-means while said electrical energy-translating device is in useful operation.

12. In combination: an electrical energy-translating device having an insulated conductor; a cooling medium therefor; a control-means, means for developing a first actuating-force operative on said control-means in response to the temperature of a portion of said cooling medium which has become heated by said energy-translating device, means for developing a second actuating-force operative on said control-means in response to a current in said conductor, said last-mentioned means having a delayed action requiring a time of the order of a minute to reach 63% of its maximum steady-state response to a changed value of current, said first and second actuating-forces being so balanced that the ratio of the second actuating-force to the first actuating-force is smaller than the ratio of the rate of electrical heat-input into the conductor to the rate of heat-radiation from the conductor to the cooling medium so that the conductor is permitted to attain an abnormally high temperature for heavy overloads lasting for materially less than 2 hours as compared to its temperature for smaller overloads lasting for materially more than 2 hours, the critical response-condition of the control-means being the same in each case, and means responsive to a predetermined response of said control-means while said electrical energy-translating device is in useful operation, the second actuating-force being sufficiently small, relative to the temperature-gradient between said conductor and said cooling medium, so that any given long-time response of the control-means, for loads enduring for more than two hours, would be obtained at a higher conductor-temperature when the cooling medium is relatively cool than when it is relatively warm, and the resultant effects of the two actuating forces being to cause said control-means to reach its aforesaid predetermined response in a time which approximates a constant fixed relation to the time that the energy-translating device can safely carry the given overload, both for overloads of such intensity that the limiting time is of the order of slightly more than a minute, and for smaller overloads that may be left on for more than two hours, and also for intermediate loads which may safely be left on for a maximum time of the order of an hour.

13. In combination: an electrical energy-translating device having an insulated conductor; a cooling medium therefor; a thermally responsive device in heat-exchanging relation to a portion of the cooling medium which has become heated by said energy-translating device; electrical heating-means for heating said thermally responsive device in response to a load-current traversing said conductor at a rate which is sufficiently small, in comparison to the amount of heating-energy that is expended in heating the mass of the thermally responsive member, so that the heating-transient lasts for a period of the order of a minute after the occurrence of a heavy overload-current; the rate of heat-exchange between the thermally responsive member and the cooling medium, and the rate of current-responsive heating-input into the thermally responsive member, being so balanced that the temperature-gradient between the thermally responsive member and the cooling medium is lower than the temperature-gradient between the conductor and the cooling medium so that the conductor is permitted to attain an abnormally high temperature for heavy overloads lasting for materially less than 2 hours as compared to its temperature for smaller overloads lasting for materially more than 2 hours, the critical temperature of the thermally responsive member being the same in each case; and means responsive to a predetermined temperature of the thermally responsive member while said electrical energy-translating device is in useful operation.

14. In combination: an electrical energy-translating device having an insulated conductor; a cooling medium therefor; a thermally responsive device in heat-exchanging relation to a portion of the cooling medium which has become heated by said energy-translating device; electrical heating-means for heating said thermally responsive device in response to a load-current traversing said conductor; the effective heat-dissipating area of the thermally responsive member and the coefficient of heat-interchange between the thermally responsive member and the cooling medium being sufficiently small and the specific heat and the mass of the heated material of the thermally responsive member being sufficiently large to cause the current-responsive heating of said thermally responsive member to have a transient which requires a time of the order of a minute to reach 63% of its maximum steady-state response to a changed value of current, the rate of heat-exchange between the thermally responsive member and the cooling medium, and the rate of current-responsive heating-input into the thermally responsive member, being so balanced that the temperature-gradient between the thermally responsive member and the cooling medium is lower than the temperature-gradient between the conductor and the cooling medium so that the conductor is permitted to attain an abnormally high temperature for heavy overloads lasting for materially less than 2 hours as compared to its temperature for smaller overloads lasting for materially more than 2 hours, the critical temperature of the thermally responsive member being the same in each case; and means responsive to a predetermined temperature of said thermally responsive member while said electrical energy-translating device is in useful operation.

15. In combination: an electrical energy-translating device having an insulated conductor; a cooling medium therefor; a thermally responsive device in heat-exchanging relation to a portion of the cooling medium which has become heated by said energy-translating device; electrical heating-means for heating said thermally responsive device in response to a load-current traversing said conductor; the effective heat-dissipating area of the thermally responsive member and the coefficient of heat-interchange between the thermally responsive member and the cooling medium being sufficiently small and the specific heat and the mass of the member being sufficiently large to cause the current-responsive heating of said thermally responsive member to have a transient which requires a time of the order of a minute to reach 63% of its maximum steady-state response to a changed value of current, the rate of heat-exchange between the thermally responsive member and the cooling medium, and the rate of current-responsive heating-input into the thermally responsive member, being so balanced that the temperature-gradient between the thermally responsive member and the cooling medium is lower than the temperature-gradient between the conductor and the cooling medium so that the conductor is permitted to attain an abnormally high temperature for heavy overloads lasting for materially less than 2 hours as compared to its temperature for smaller overloads lasting for materially more than 2 hours, the critical temperature of the thermally responsive member being the same in each case; and means responsive to a predetermined temperature of said thermally responsive member while said electrical energy-translating device is in useful operation, the resultant effects of the rate of heat-exchange and the rate of current-responsive heating of the thermally responsive member being such as to cause the continuous-load temperature of the thermally responsive member to be considerably lower than that of the conductor, and also such as to cause said thermally responsive member to reach its aforesaid predetermined temperature in a time which approximates a constant fixed relation to the time that the energy-translating device can safely carry the given overload, both for overloads of such intensity that the limiting time is of the order of slightly more than a minute, and for smaller overloads that may be left on for more than two hours, and also for intermediate loads which may safely be left on for a maximum time of the order of an hour.

16. An electrical transformer having an insulated conductor constituting a winding, a magnetizable core, a cooling medium, a control-means, means for developing a first actuating-force operative on said control-means in response to the temperature of a portion of said cooling medium which has become heated by said transformer, means for developing a second actuating-force operative on said control-means in response to a current in said winding, said first and second actuating-forces being so balanced that the ratio of the second actuating-force to the first actuating-force is smaller than the ratio of the rate of electrical heat-input into conductor to the rate of heat-radiation from the conductor to the cooling medium so that the conductor is permitted to attain an abnormally high temperature for heavy overloads lasting for materially less than 2 hours as compared to its temperature for smaller overloads lasting for materially more than 2 hours, the critical response-condition of the control-means being the same in each case, and means responsive to a predetermined response of said control-means while said electrical transformer is in useful operation, said first and second forces being so balanced that said conductor reaches a higher temperature upon the occurrence of said predetermined response of said control-means, on long-continued overloads, when said cooling medium is relatively cool, than when said cooling medium is relatively warm, the time-constant of the means for developing said second force being of the order of a minute to reach 63% of its maximum steady-state response to a changed value of current.

HENRY V. PUTMAN.
JOHN K. HODNETTE.
ARTHUR M. LOCKIE.
MERRILL G. LEONARD.